United States Patent [19]

Sichling et al.

[11] 4,379,226
[45] Apr. 5, 1983

[54] METHOD AND SENSOR DEVICE FOR MEASURING A PHYSICAL PARAMETER UTILIZING AN OSCILLATORY, LIGHT MODULATION ELEMENT

[75] Inventors: Georg H. Sichling, Corvallis, Oreg.; Helmut Schwab; Bernard Schwab, both of Princeton, N.J.

[73] Assignee: Siemens Corporation, Iselin, N.J.

[21] Appl. No.: 230,868

[22] Filed: Feb. 2, 1981

[51] Int. Cl.³ .......................... G01L 1/10; G02B 5/14
[52] U.S. Cl. ................................ 250/231 R; 73/653; 73/657; 250/231 P
[58] Field of Search ............... 250/227, 231 R, 231 P; 73/651, 653–657, 778; 350/96.1, 96.24; 356/216

[56] References Cited

U.S. PATENT DOCUMENTS

| | | | |
|---|---|---|---|
| 3,882,718 | 5/1975 | Kriebel | 73/655 X |
| 4,071,753 | 1/1978 | Fulenwider et al. | 250/231 R X |
| 4,118,977 | 10/1978 | Olsen et al. | |
| 4,275,296 | 6/1981 | Adolfsson | 250/227 |
| 4,345,482 | 8/1982 | Adolfsson et al. | 73/653 X |

FOREIGN PATENT DOCUMENTS 10221 4/1980 European Pat. Off. .
2719937 11/1978 Fed. Rep. of Germany .
2905630 8/1979 Fed. Rep. of Germany .
2903821 8/1980 Fed. Rep. of Germany .
1484333 9/1977 United Kingdom .

OTHER PUBLICATIONS

K. A. James, W. H. Quick and V. H. Stahan, "Fiber Optics: The Way to True Digital Sensors?", *Control Engineering*, Feb. 1979, pp. 30–33.

*Primary Examiner*—David C. Nelms
*Assistant Examiner*—Edward P. Westin
*Attorney, Agent, or Firm*—Karl F. Milde, Jr.

[57] ABSTRACT

A light beam is transmitted by a fiber optical cable to a light modulation device such as a vibrating filament, bar or plate. This device or oscillator modulates the light intensity with a frequency which is dependent upon the physical parameter to be measured. Oscillations are sustained by a striking device. The modulated light beam is transmitted by a fiber optical cable from the measurement location to an evaluation location where the frequency of the modulated light beam is measured. The measured frequency is a function of the physical parameter.

1 Claim, 16 Drawing Figures

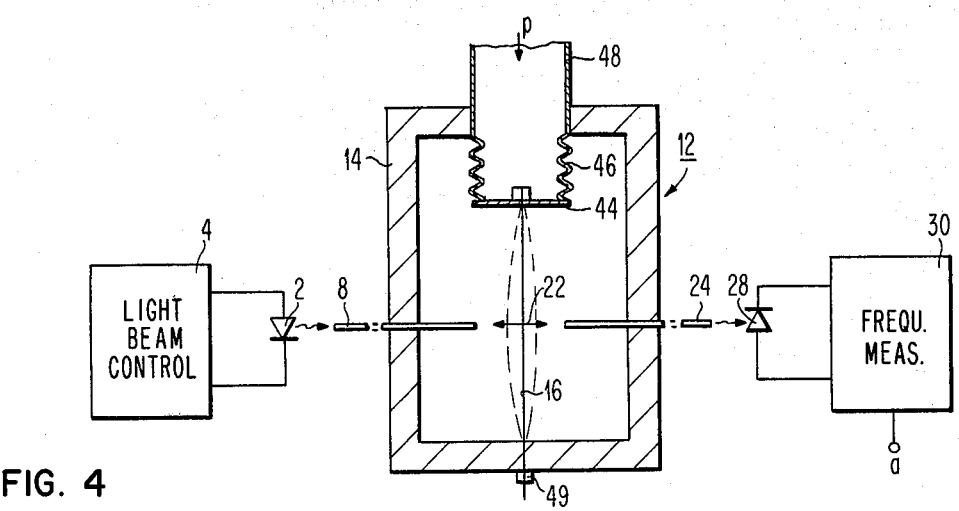
FIG. 4
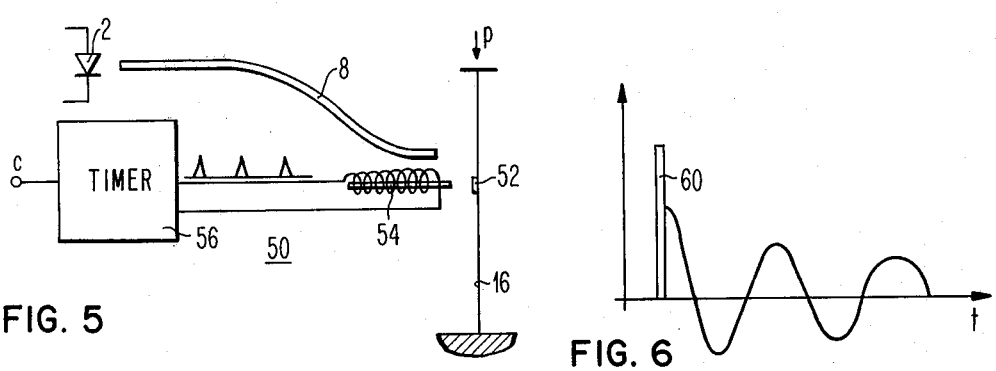
FIG. 5
FIG. 6
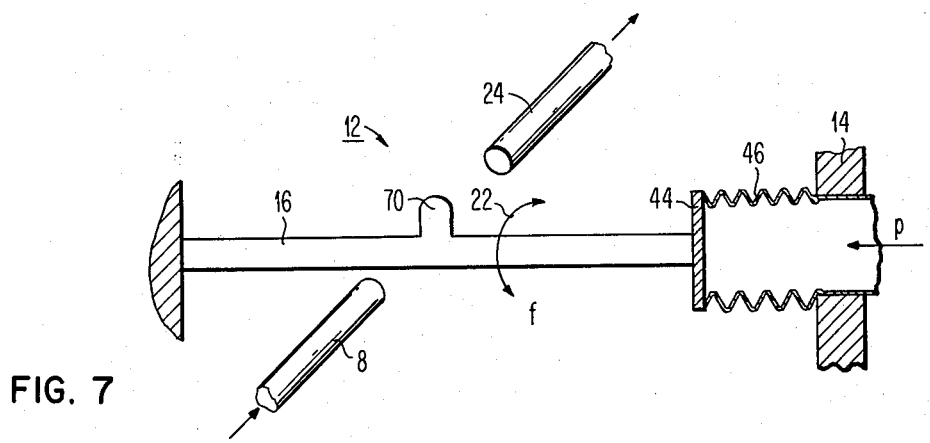
FIG. 7

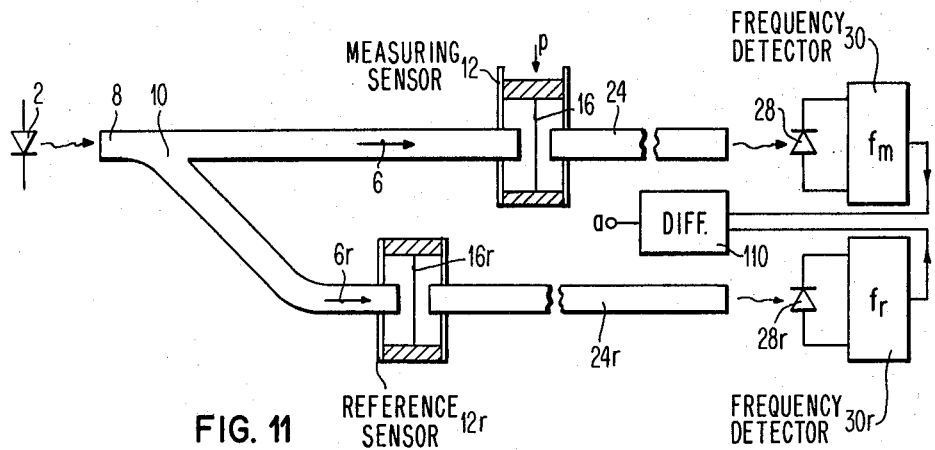
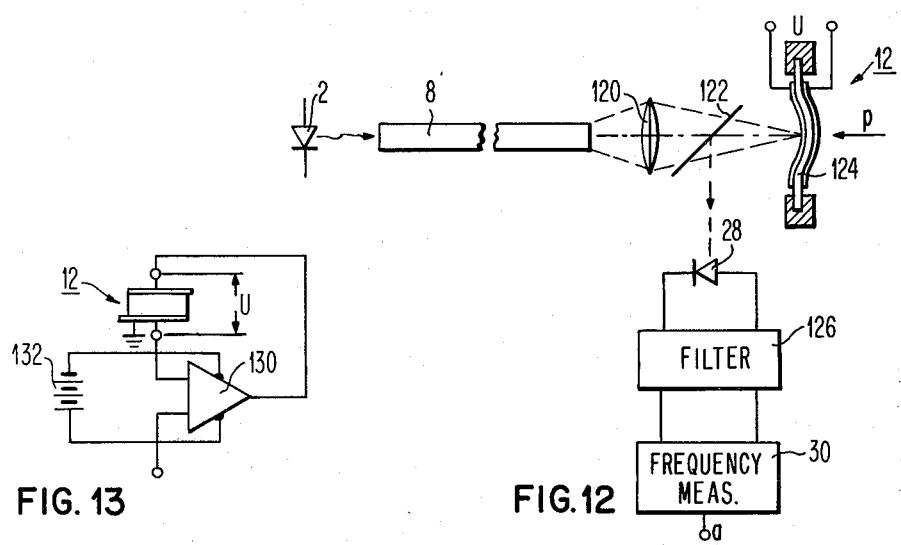
FIG. 13    FIG. 12
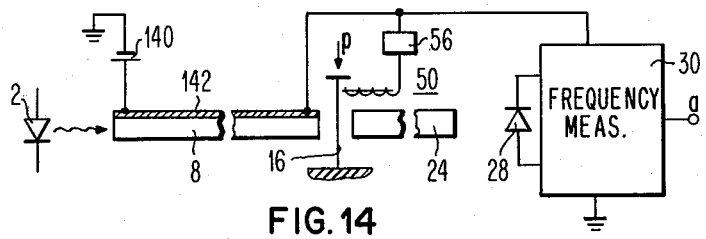
FIG. 14
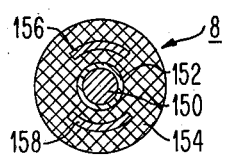 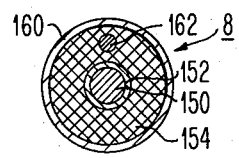
FIG. 15    FIG. 16

METHOD AND SENSOR DEVICE FOR MEASURING A PHYSICAL PARAMETER UTILIZING AN OSCILLATORY, LIGHT MODULATION ELEMENT

CROSS REFERENCE TO RELATED APPLICATIONS

This application relates to the same technical field as the application of Georg H. Sichling, Helmut Schwab and Bernard Schwab entitled "Fiber Optical Sensor Device", Ser. No. 230,808, also assigned to Siemens Corp., filed on the same day as this application.

BACKGROUND OF THE INVENTION

1. Field of the Invention

This invention relates to a novel and improved method for measuring a physical parameter at a first location which is remote from a second location. This invention also relates to a novel and improved sensor device for measuring such a physical parameter. In particular, this invention relates to a measuring method and to a sensor device which incorporates fiber optical signal transmission concepts.

2. Description of the Prior Art

Fiber optical signal transmission has become a significant technological innovation in electronic systems during the last years. Among the reasons for preference of fiber optical signal transmission to the former electric signal transmission is the availability of additional band width combined with the elimination of electromagnetic interferences. Other reasons include the convenient separation of the electric potentials of various system components.

Fiber optical transmission has been used for medium and long distance communication and for digital data transmission in certain industry applications where electromagnetic interference or electric separation is of special significance. Fiber optical transmission lines have also been used in connection with high voltage switching, power plant control and process control of electric furnaces. The application in aircraft and in automobiles is discussed.

In control systems signal communication in digital form is performed not only between data processing units but also in communication with input and output devices. Special signal sensitivity exists between sensors and data processing devices. Therefor, fiber optical communication on digital basis has been used for signal transmission between sensors and the control system (Control Engineering, February 1979, pages 30-33). The sensor devices serve to acquire input information relative to physical parameters which are of significance for the control system, such as temperature, pressure, position, flow, speed, etc.

In order to obtain a sensor device of high accuracy, it is advisable to convert the physical parameter to be measured directly into an optical signal and to transmit this signal through an optical fiber transmission line to the evaluation side of the electronic system. For this purpose sensor devices may be designed so that they do not require an energy source on the measurement side. Such sensor devices work entirely on optical principles and operate strictly with fiber optical signal transmission. These sensor devices may be termed passive sensors. They have the inherent benefit of high protection against electromagnetic interference and system simplicity.

Sensor devices may also be designed so that they utilize an auxiliary energy source for the sensing function in order to arrive finally at optical signals which may be transmitted through the optical fiber transmission line. The energy source may be an optical, an electrical or any other source, while the sensing principle and the signal transmission are still of optical nature. Such devices may be termed active devices.

In the European Patent Application Publication No. 10 221 is disclosed a fiber optical measuring apparatus which is used for the measurement of current or voltage. An electrical measurement signal is converted into mechanical motion which modulates a light beam. This measurement apparatus strictly makes use of amplitude measurement and is therefore subject to environmental disturbances.

SUMMARY OF THE INVENTION

1. Objects

It is an object of this invention to provide a method for measuring a physical parameter at a first location which is remote from a second location, whereby the measurement signal is not subject to environmental disturbances.

It is another object of this invention to provide a fiber optical sensor device which can withstand hostile environmental conditions, such as humidity, oil, acid and electromagnetic interference.

It is still another object of this invention to provide a fiber optical sensor device for transmission of a physical parameter from one location to another through a fiber optical transmission line, which device has a very simple structure.

It is still another object of this invention to provide a fiber optical sensor device which can be manufactured relatively simply and inexpensively.

It is still another object of this invention to provide a fiber optical sensor system which requires a single light source for obtaining a measurement signal from the measurement side which is remote from the evaluation side.

It is still another object of this invention to provide a fiber optical sensor device which can be used for automotive applications.

It is still another object of this invention to provide a measuring method and a sensor device which are based on frequency measurement so that a high accuracy may be obtained.

2. Summary

According to this invention, a method for measuring a physical parameter at a first location which is remote from a second location comprises the following steps: First a light beam is generated. Then, the amplitude of this light beam is modulated at the first or measurement location with a frequency which is dependent upon the physical parameter to be measured. Subsequently, the modulated light beam is transmitted from the first or measurement location to the second or evaluation location. Finally, the frequency of the modulated light beam is measured at the measurement location. The measured frequency indicates the value of the physical parameter to be measured.

According to this invention, a sensor device comprises a source generating a light beam, a light modulation device arranged at a first location, and a frequency detector. The light modulation device, which has a modulation frequency that is determined by the physical parameter to be measured, modulates the amplitude of the light beam. The frequency detector which is arranged at the second location measures the frequency of the amplitude modulated light beam. The measured frequency indicates the value of the physical parameter.

Preferably an oscillating string may be used for modulating the light beam. The term "string" shall comprise all kinds of bars, rods, blades, spring leaves, blades and plates the oscillation frequency of which can be influenced by a physical parameter.

The foregoing and other objects, features and advantages of the invention will be apparent from the following more particular description of preferred embodiments of the invention, as illustrated in the accompanying drawings.

Elements and components corresponding to each other are provided with the same reference numerals in all figures.

BRIEF DESCRIPTION OF THE DRAWINGS

In the drawings:

FIG. 4 is a fiber optical measuring system incorporating a sensor device for measuring a pressure, according to this invention;

FIG. 5 is a partial view of a fiber optical measuring device, showing a electromechanical device for starting and maintaining the oscillations of a string;

FIG. 6 is a diagram showing an excitation pulse and dampened oscillations of a string;

FIG. 7 is still another sensor device performing rotational oscillations, according to this invention;

FIG. 11 is another fiber optical sensing system including a measuring and a reference light path;

FIG. 12 is another fiber optical sensing system including an oscillating crystal;

FIG. 13 is an electrical supply circuit for energizing the crystal of FIG. 12;

FIG. 14 is another fiber optical sensing system having an energy supply via a fiber optical transmission line;

FIG. 15 is a cross-section of a transmission line applicable in FIG. 14; and

FIG. 16 is a cross-section of another transmission line applicable in FIG. 14.

DETAILED DESCRIPTION OF THE PREFERRED EMBODIMENTS

Figure 1:
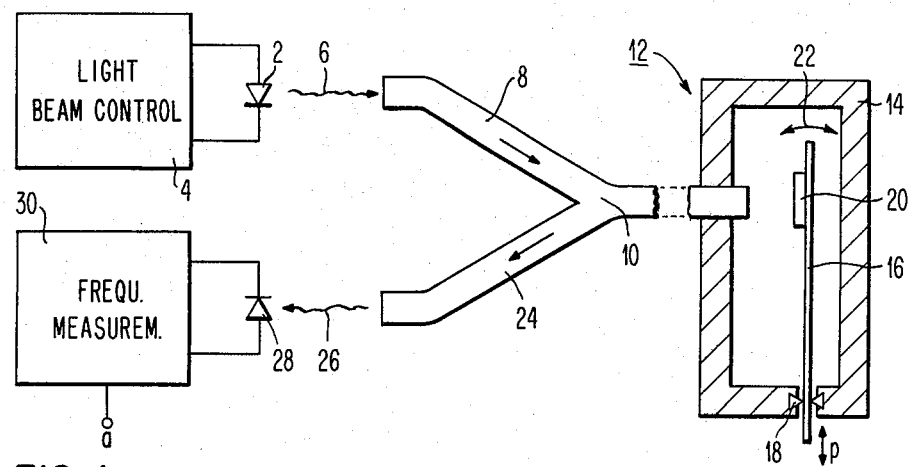
FIG. 1 is a fiber optical measuring system incorporating a sensor device for measuring a physical parameter, according to this invention.

With reference to FIG. 1, wherein the principle of a sensor device for measuring a physical parameter p is illustrated, the location of measurement where the parameter p prevails is remote from the location of evaluation.

A light source or emitter 2 is controlled by a light beam control unit 4. The light source 2 may be, for instance, a light emitting diode (LED) or a laser. The light beam 6 emitted by the light source 2 is directed into the first or input end of a fiber optical transmission cable or line 8 which contains a branching element 10 of conventional design.

At the second or output end of the fiber optical transmission line 8 there is arranged a sensor device 12 which modulates the amplitude of the impinging light beam 6. The sensor device 12 is characterized by the fact that the modulation frequency is determined by the physical parameter p to be measured. In particular, the sensor device 12 comprises a housing 14 into the interior of which leads the second end of the fiber optical transmission line 8. The interior of the housing 14 also contains a thin blade, strip or leaf spring 16 which is movable perpendicularly to the face end of the fiber optical transmission line 8. The displacement is performed under the influence of the physical parameter p. The leaf spring 16 is supported on one end by a bearing 18. On the other end of the leaf spring 16 is provided an elongated mirror 20. The mirror 20 may be a thin, light reflecting coating on the upper end of the leaf spring 16. The mirror 20 is arranged just opposite to the face end of the line 8 so that it may reflect the impinging light in all possible locations of the spring 16.

It will be noted that the leaf spring 16 and the mirror 20 form a mechanical oscillator which can oscillate in the direction of the double arrow 22, that is about the bearing 18. The oscillation frequency is dependent on the length of the leaf spring 16. Therefore, a change of the length in dependence on the parameter p results in a change of the frequency of the amplitude modulation of the reflected light. The reflected light passes through the branching element 10 and a second fiber optical transmission line 24. The modulated light beam 26 finally arrives at a light receiver 28, such as a photo diode or a photocell. The light receiver 28 is electrically connected to a frequency detector device 30 which is provided for measuring the oscillation frequency of the modulated light beam 26. The light sensitive device 28 is arranged on the same side as the light emitting device 2. The output signal a of the frequency detector device 30 indicates the value of the physical parameter p.

It will be understood that the measurement of the physical parameter p is performed as a measurement of the frequency of the oscillating device 16,20. It may be generally easier, and more precise to measure the frequency of a signal or to determine digital values than to measure analog parameters. According to this invention, the measurement of the parameter may be basically reduced to the counting of pulses or a resonance method which require only simple electronic means. Due to the application of two fiber optical transmission lines 8 and 24, signal deteriorations are widely eliminated.

Figure 2:
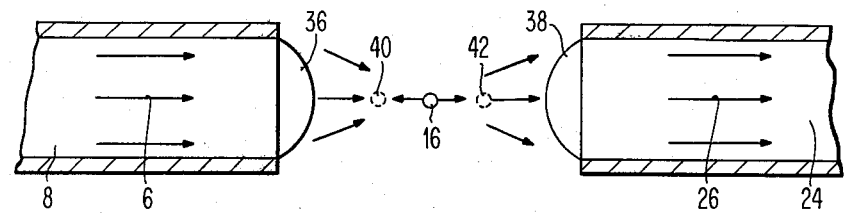
FIG. 2 is the cross-sectional view of another sensor device containing an oscillating string, according to this invention.
Figure 3:
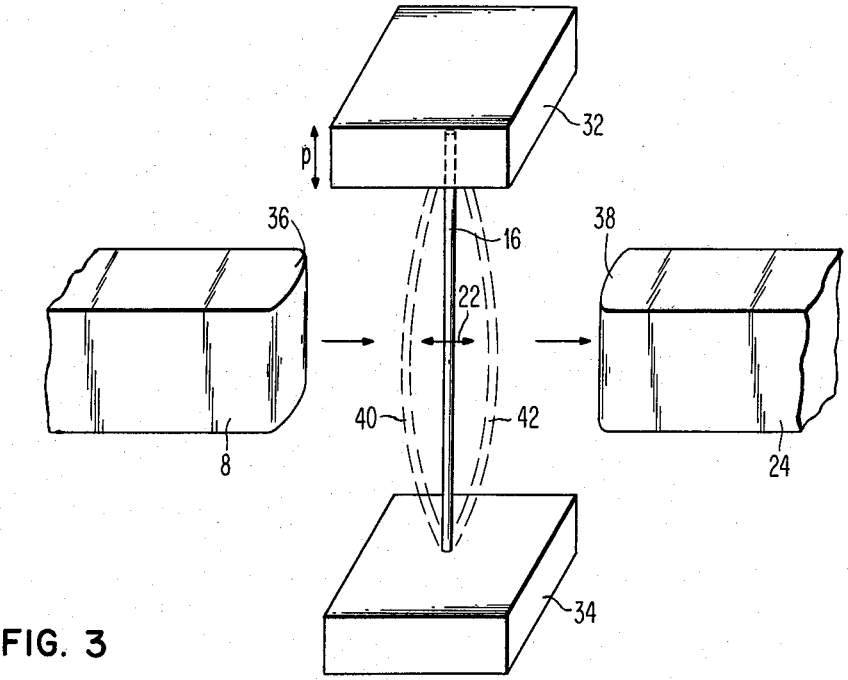
FIG. 3 is a perspective view of a sensor device similar to FIG. 2 according to this invention.

In FIGS. 2 and 3 is illustrated another embodiment of an oscillating sensor device. This sensor device also contains an input fiber optical transmission line 8, an oscillator 16 proper, and an output fiber optical transmission line 24. In this embodiment, the oscillator 16 is a thin bar, rod or vibrant filament 16 which is held under some tension between holding devices 32 and 34 such as plates or boards. The filament 16 is of equal thickness along its longitudinal axis. The ends of the filament 16 are fixed with respect to the holding devices 32 and 34, respectively. The lower holding device 34 is also fixed with respect to the fiber optical transmission lines 8 and 24, whereas the upper holding device 32 is movable in the direction of the longitudinal axis of the filament 16. A displacement is performed under the influence of the physical parameter p which determines the tension of the filament 16.

As illustrated in FIGS. 2 and 3, the end faces of the lines 8 and 24, which are adjacent to each other and form a gap in between, may be provided with lenses 36 and 38, respectively. The lens 36 is used for concentrating the light beam 6 on the filament 16, and the lens 38 is used for collecting the transmitted light into the transmission line 24. If transmission lines 8 and 24 of small diameter are applied, the lenses 36 and 38 may be omitted. In FIGS. 2 and 3, cylindrical lenses are applied. Instead, also a wedge shape may be used. In a rest or zero position, the filament 16 is positioned in the focal points or lines of both lenses 36 and 38.

The diameter of the filament 16 is preferably of the same size or smaller than the diameter of the fiber optical transmission lines 8 and 24. In the embodiments of FIGS. 2 and 3, its diameter is much smaller than the diameter of the lines 8 and 24. Since the filament 16 is positioned in the focal line of the lens 36, it collects all light from the line 8.

In operation, the light passing from the input line 8 to the output line 24 is interrupted periodically by the filament 16. The filament 16 oscillates in the gap between th two fiber lines 8 and 24 in the direction of the light beam. The hatch positions 40 and 42 indicate the two oscillation end points where little or no light is diverted or absorbed. In the middle or zero position between the oscillation end points 40 and 42, the filament 16 covers the focal line of the lens 36, thereby interrupting completely the light passage to the output line 24. For the function of the sensor device, it is not absolutely necessary that the filament 16 in its zero position covers completely the focal point or line.

In FIG. 4 is illustrated an embodiment of a sensor device for measuring a pressure of a gas or fluid. In this embodiment, instead of a pressure, any physical parameter p can be measured, a change of which leads to a mechanical change in the tension of the filament 16. The filament 16 is arranged in a gap between the input and output ends of the transmission lines 8 and 24, respectively. These ends are protected by a housing 14. One end of the filament 16 is attached to a supporting plate 44 which covers the lower end face of a bellows section 46. The bellows section 46 is secured with its upper end to the housing 14. The interior of the bellows section is either exposed to the pressure of the surroundings or, as shown in FIG. 4, connected to a tube 48 the internal pressure of which is to be measured. At one end of the filament 16, there may be provided a threaded mounting member or screw 49 or another adjusting device for controlling the tension of the filament.

The oscillation frequency of the filament 16 changes as a function of the position of the end plate 44 and thereby of the pressure applied to the end plate 44. The mechanical oscillations of the string 16 result in corresponding changes of the transmitted light intensity. The modulated light is conducted through a second fiber optical line 24 to the light sensing device 28. The frequency of the transmitted light is measured by means of the light sensitive device 28 and the frequency measuring device 30. A simple digital counter or resonance device on the input side of the frequency measuring device 30 allows for digital sensor readings free from transmission problems. The output signal α indicates the value of the parameter.

As indicated in FIG. 4, the filament 16 may oscillate in the direction of the light beam (arrow 22). Yet, it is also possible that the filament 16 oscillates perpendicularly to the direction of transmission, that is perpendicularly to the paper plane in FIG. 4. Also in such an embodiment the transmitted light intensity is modulated in accordance with the oscillator frequency.

In the embodiment of FIGS. 1–4, some sort of excitation means is required for initiating and continuing of the oscillations. These oscillations may be loss subjected or dampened oscillations and therefore require an energy source. For instance, the oscillations of the mechanical oscillator 16 in FIGS. 1–4 may be caused by a medium which vibrates due to its own function. For example, the sensor device 12 may be attached to a motor of an automobile which will vibrate in operation. The excitation of the oscillations may also be performed by a striking device including an auxiliary energy source which may be arranged either on the sensor side or the evaluation side of the fiber optical transmission line 8 and/or 24. This striking device may operate, for instance, on optical, mechanical, electrostatic and/or electromagnetic principles. The auxiliary energy source may be, for instance, a battery or a photocell.

In FIG. 5, an electromechanical embodiment of a striking or picking device 50 is shown. This device 50 includes a small ferro-magnetic element 52 which is attached to the filament 16. Adjacent to the element 52 is arranged a solenoid type of coil 54 which is energized by a series of short pulses from an electric oscillator or timer 56. The frequency of the output pulses may be controlled by a control signal c derived from any control unit. Each output pulse causes the element 52 to be attracted by the coil 54. This results in picking the filament 16 at a frequency which is determined by the frequency of the timer 56. The picking frequency should be close to the oscillation frequency.

The diagram in FIG. 6 illustrates that the energy for picking the filament 16 may be transmitted optically to the measurement side. According to FIG. 6, strong light pulses or excitation pulses 60 are repeatedly transmitted from the light source 2 through the input line 8 to the filament 16. These light pulses should contain sufficient energy to initiate the oscillation of the sensor device 12 through the molecule pressure of the warmed up filament 16. This principle has already been used in decorative glass units which enclose rotors receiving the energy for rotation from transversal "light pressure" on metallic vs. black surfaces. In order to use this principle, one side of the filament or leaf spring 16 should have a black surface. Decorative glass units are also known as radiometers.

As shown in FIG. 6, the amplitude of the initiated oscillation will decrease in accordance with the dampening of the oscillator 16 in its environment. The frequency of the dampened oscillation is a measure of the parameter value p. Basically, a single strike to or a single picking of the filament 16 may be sufficient for a measurement. However, it is of advantage to strike or pick the filament 16 repeatedly or periodically in order to obtain an average frequency value. If a low striking or picking frequency is applied, the oscillation period between two excitation pulses 60 must be sufficient to measure the frequency.

It should also be mentioned that the energy, which is optically transmitted to the measurement side, may be transferred into electric energy and stored by a storage device such as a capacitor.

FIG. 7 shows an embodiment of a passive oscillator device 12 which is similar to the device shown in FIG. 4. Yet, this embodiment uses rotational oscillations. The oscillator 16 is here a filament, rod, or cross bar made out of metal. The cross bar 16 is provided with a protrusion 70 in its middle section. The protrusion 70 is a thin plate which is covered with a black substance on one of its sides. The protrusion 70 more or less interrupts the light beam on its passage from the first fiber optical transmission line 8 to the second fiber optical transmission line 24, as the cross bar 16 oscillates about its longitudinal axis. Both ends of the cross bar 16 are fixed as far as the rotational oscillations are concerned. Similarly to the explanation given in connection with FIG. 6, the rotational oscillations of the cross bar 16 may be sustained through light pulses 60 (FIG. 6) transmitted through the input line 8 and partially absorbed by the protrusion 70. For this purpose, one side of the protrusion 70 is provided with a black coating. Changes of the physical parameter p create changes in tension of the oscillator bar 16, thereby changing the oscillation frequency f.

In FIG. 7 is illustrated the rest or zero position of the cross bar 16. The protrusion 70 blocks the light from passing into the output line 24. If the bar 16 is rotated about 90° in either direction about its longitudinal axis, the light beam from the input line 8 may pass through to the output line 24 without any inhibition. The measurement of the frequency f may be performed as indicated above.

Figure 8:
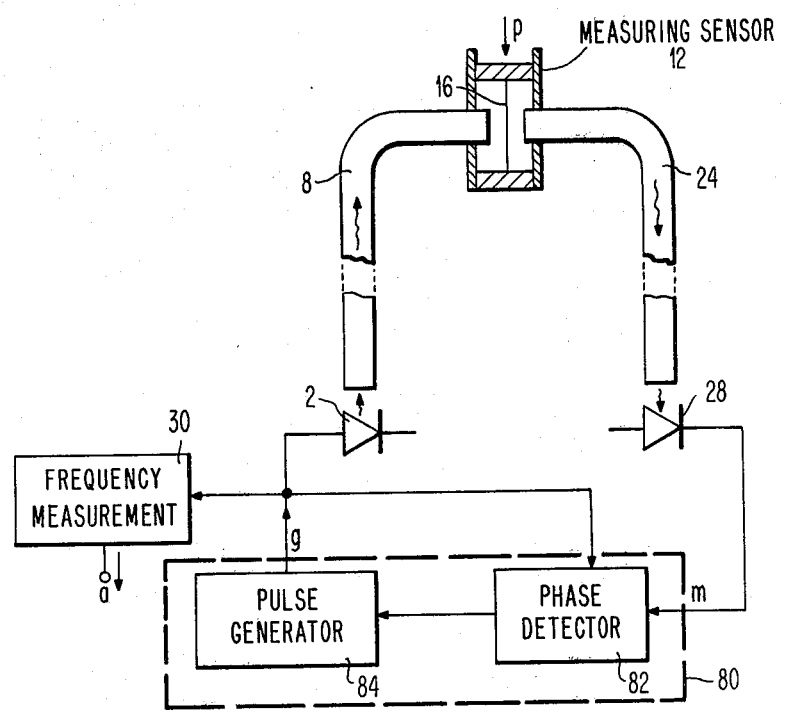
FIG. 8 is a fiber optical sensing system including electronic feedback means.
Figure 9:
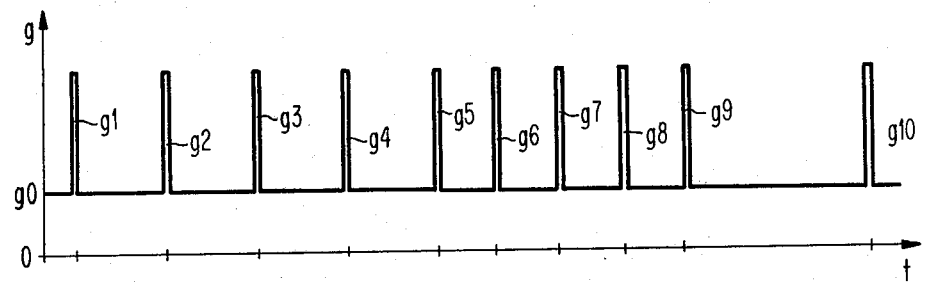
FIG. 9 is a time diagram including pulses for excitation of the system according to FIG. 8.
Figure 10:
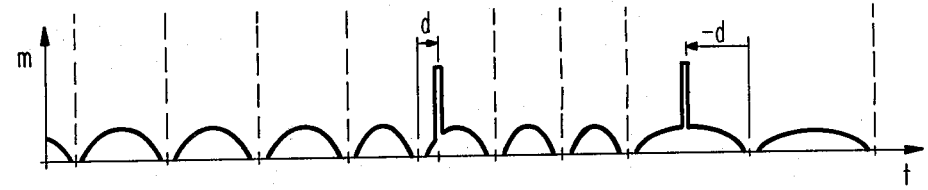
FIG. 10 is a time diagram of the output light beam of the system illustrated in FIG. 8 including half-waves.

In FIGS. 8-10 is illustrated a sensor system which includes electronic feed-back circuitry. By this feedback circuitry, energy transmitting light pulses which are repeatedly emitted can be timed to lock onto the oscillations in proper phase, even as the frequency of the sensor device changes. This results in sustained oscillations.

According to FIG. 8, a voltage control oscillator 80 contains a phase detector 82 and a pulse generator 84. The phase detector 82 and the pulse generator 84 are parts of a phase locked loop. The phase detector 82 is fed with the output signal m of the light receiving element 28. The phase detector 82 includes a peak detector and a zero voltage detector (not shown). The output of the phase detector 82 is connected to the frequency control input of the pulse generator 84. This pulse generator 84 generates an output signal g for energizing the light emitter 2. The frequency of the output signal g is measured in a frequency measuring device 30. The output signal g is also applied to the phase detector 82 for determination of the phase relationship of pulses.

In FIG. 9 the output signal g of the pulse generator 84 is illustrated. This output signal g results in a corresponding input light amplitude. The signal g contains a certain dc ground level $g_o$ on which several small striking pulses g1, g2, . . . g10 are superimposed. For the following consideration it is assumed that the diameter of the filament 16 is slightly larger than the light focus in the zero position of FIG. 8.

As illustrated in FIG. 10, the output signal m of the light receiver 28 is made up of several half waves which are separated by short pauses. Adjacent ones of the half waves represent a deflection of the filament 16 towards the right side and subsequently towards the left side in FIG. 8. Whenever one of the first four striking pulses g1-g4 occurs, the focal line is completely covered by the filament 16, and consequently the output signal m of the light receiver 28 is zero. This is represented by the short pauses between the half-waves in FIG. 10.

It is now assumed that after the striking pulse g4 had been issued, the parameter p has changed so that the filament 16 has assumed a higher oscillation frequency. Therefore, the next half wave in FIG. 10 is shorter than the preceding half waves, and the zero position of the filament 16 is shifted to the left by a time distance d with regard to the next striking pulse g5. In other words, the next striking pulse g5 comes late with respect to the zero position by the time difference d. At the occurence of the striking pulse g5, the filament 16 is no longer in the zero position and is moving towards the other oscilation end point. Therefore, due to the striking pulse g5 a light pulse is received by the receiving element 28, as can be seen in FIG. 10. The time difference d is measured by the phase detector 82, and the frequency of the pulse generator 84 is adjusted by the output signal of the phase detector 82 correspondingly. Therefore, the next striking pulse g6 will occur at the next zero position of the filament 16, which now vibrates with a higher oscillation frequency. Since the next three striking pulses g6, g7, and g8 are tuned to the zero positions, the frequency of the pulse generator 84 is adjusted. The new value can be determined by the frequency measurement device 30.

It is further assumed that after the striking pulse g8, the physical parameter p has changed again. This time the change is such that the oscillation frequency has become smaller. Therefore, the following half waves in FIG. 10 have become longer. As can be seen in FIGS. 9 and 10, the next striking pulse g9 comes too early with respect to the next zero position of the string 16. The time difference, which is referred to as "−d", is measured by the phase detector 82, and the pulse generator 84 is subsequently corrected as far as its frequency is concerned. As a consequence, the next striking pulse g10 will again arrive at the zero position of the filament 16. That is, the pulse generator 84 is again tuned to the oscillating frequency of the filament 16. The new frequency value is measured and indicated by the frequency measurement device 30.

According to the embodiment in FIG. 11, a light source 2, preferably a laser, emits a light beam into the end of a fiber optical transmission line 8. A branching element 10 such as a T-coupler divides the light beam into a measuring beam 6 and a reference beam 6r. The measuring beam 6 passes through a sensor device 12 which is exposed to a physical parameter p to be measured. The intensity of the output light beam is modulated by an oscillator 16 in accordance with the parameter p. The reference beam 6r passes through a reference sensor device 12r the oscillator 16r of which has a modulation frequency that is constant. Therefore, the intensity of the output light beam is periodically changed with a constant frequency.

Both output light beams are conducted through fiber optical paths 24 and 24r respectively, to light detecting elements 28 and 28r, respectively. The electrical output signals of these elements 28 and 28r are applied to frequency detectors 30 and 30r, respectively, for determining the frequencies $f_m$ and $f_r$. The output signals of the detectors 30 and 30r are applied to an element 110 which forms the difference between these signals. The difference is an indication of the value of the physical parameter p. The illustrated sensor system provides for a frequency normal for comparison purposes.

In FIG. 12 is illustrated still another sensor device. The light beam of a light source 2 is conducted through a fiber optical cable 8, a lens 120 and a beam splitter 122 to a crystal sensor device 12. The crystal sensor device 12 contains a crystal plate 124 which is covered on both sides with electrodes. The piezoelectric effect or another effect may be used for light modulation. Light energy pulses on the input side may initiate oscillations through transformation into heat and, hence, expansion upon impact in the sensor device. The crystal plate 124 is exposed to a physical parameter p which may be, for instance, temperature. In the present embodiment, a voltage U is applied to the electrodes of the crystal plate. Under the influence of the voltage U, the crystal plate 124 performs vibrations or mechanical oscillations.

In some technical fields, quartz crystals are applied which usually are largely independent of temperature fluctuations and atmospheric influences. These quartz crystals are of prime importance to control and filter circuit applications requiring high-performance electromechanical resonant components exhibiting high frequency constancy. In the present embodiment, however, a crystal plate 124 is used the mechanical dimensions of which vary with the ambient temperature. Consequently, the resonance frequency of the crystal plate 124 varies in accordance with the temperature.

In FIG. 12, the crystal plate 124 is shown curved, that is, performing flexural vibration bending oscillations. Instead a crystal plate 124 could also be used to perform longitudinal oscillations. In accordance with the oscillation frequency, the impinging light beam is more or less reflected. It passes through the beam splitter 122 and arrives at a photodetector 28 which is provided for measuring the modulated light. The electric output signal of the light detector 28 is applied to a filter 126 which is provided for cutting off all dc components. The ac component of the output signal is subsequently forwarded to a frequency measuring device 30 the output signal a of which is indicative of the parameter p to be measured.

In FIG. 13 is illustrated that the crystal sensor device 12 is supplied with the voltage U from an amplifier 130 which in turn is energized from an auxiliary energy source 132. This energy source 132 is arranged on the measurement side of the sensor system. The auxiliary energy source 132 may be a battery or a photocell which is illuminated by any natural source (sun) or by an artificial light source. It may also be any other voltage and/or current generating device, such as a radioactive source plus electricity transformer, a thermal ionic device or a thermocouple. Thermal energy may be available from the sensor environment. The mentioned energy source may also be used in connection with oscillators other than a crystal plate 124.

In FIG. 14 is illustrated a fiber optical sensor device for measuring a physical parameter p in which the electrical energy required on the measurement side is transmitted along its fiber optical transmission line 8. On the side of the light source 2 is provided an electrical source 140, such as a battery, which is connected with one terminal to ground. The other terminal is connected to a conductor 142 which leads from the light emitting side to the measuring side. The conductor 142 is part of the fiber optical transmission line 8. In particular, the conductor 142 is an electrically conducting line (wire, coating) attached to or connected with the fiber optical transmission line 8. Cross sections of embodiments of the line 8 are shown in the following FIGS. 15 and 16. On the measuring side, the conductor 142 is connected as to energize the picking device 50 which includes the oscillator or timer 56. The conductor 142 is also connected as to energize the frequency measuring device 30.

In FIGS. 15 and 16 are shown cross sections of two embodiments of a fiber optical transmission line 8 which incorporates at least one supply electrode.

In FIG. 15, the central fiber is denoted as 150, and the surrounding glass coating is denoted as 152. The fiber optical cable 150, 152, in turn, is surrounded by a plastic coating 154. Embedded in the plastic coating 154 are two thin metallic conductors 156 and 158 for energizing electrically components on the measuring side of the sensor device. As illustrated, these conductors 156, 158 may be elongated curved metal plates.

In the transmission line 8 of FIG. 16, there is also provided a plastic coating 154. This coating 154 is in turn surrounded by a metallic conductor 160. The conductor 160 may be a thin coating. Embedded in the plastic 154 is an electrode 162. The cross section of the electrode 162 indicates that it may be a thin wire.

Some sensor devices shown in the preceding figures use a bellows section 46 to measure temperature or pressure. Obviously, such bellows can be substituted by other devices changing length as a function of temperature, including bi-metals, position sensors, acceleration sensors, or any other suitable arrangement to measure the parameter under consideration.

While the form of the method and sensor device herein described constitute preferred embodiments of the invention, it is to be understood that the invention is not limited to these precise forms, and that a variety of changes may be made therein without departing from the scope of the invention.

What is claimed is:

1. A sensor device for measuring a physical parameter at a first location remote from a second location, comprising in combination:
   (a) means for generating at least one light pulse of high energy and a light beam,
   (b) light modulation means arranged at said first location and having a modulation frequency determined by said physical parameter to be measured, said light modulation means modulating the amplitude of said light beam, said light modulation means comprising,
   a mechanical oscillator arranged at said first location having a mechanical oscillator frequency, said oscillator reflecting or transmitting said light beam in accordance with said oscillator frequency, said oscillator comprising a single means for both receiving said light pulse and modulating said light beam, wherein said oscillator is formed to oscillate due to molecule pressure when said light pulse hits said single means, and
   (c) frequency detector means arranged at said second location for measuring the frequency of said modulated light beam, said frequency indicating the value of said physical parameter.

* * * * *